(12) United States Patent
Osawa et al.

(10) Patent No.: US 6,855,286 B2
(45) Date of Patent: Feb. 15, 2005

(54) INJECTION MOLD AND METHOD FOR MANUFACTURING INJECTION MOLDED ARTICLES

(75) Inventors: Yasuhisa Osawa, Gunma-ken (JP); Makoto Sato, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 145 days.

(21) Appl. No.: 10/298,926

(22) Filed: Nov. 19, 2002

(65) Prior Publication Data

US 2003/0122281 A1 Jul. 3, 2003

(30) Foreign Application Priority Data

Nov. 19, 2001 (JP) ........................................ 2001-353046

(51) Int. Cl.[7] .............................................. B29C 45/34
(52) U.S. Cl. .................... 264/328.12; 249/57; 425/546; 425/573; 425/DIG. 42
(58) Field of Search .............................. 264/328.2, 102, 264/328.12; 425/546, 543, 573, DIG. 42, DIG. 47; 249/57, 141

(56) References Cited

U.S. PATENT DOCUMENTS

| | | | | |
|---|---|---|---|---|
| 3,880,978 A | * | 4/1975 | Apostoleris et al. | ... 264/328.12 |
| 4,399,093 A | * | 8/1983 | Kirby et al. | ............. 264/328.2 |
| 5,314,326 A | * | 5/1994 | Furugohri et al. | .......... 425/573 |
| 6,089,847 A | * | 7/2000 | Inoue et al. | ................. 425/116 |
| 6,468,068 B1 | * | 10/2002 | Abe | ........................... 425/553 |

FOREIGN PATENT DOCUMENTS

| | | |
|---|---|---|
| JP | 57-22031 | 2/1982 |
| JP | 4-156321 | 5/1992 |
| JP | 11-77715 | 3/1999 |
| JP | 11-90961 | 4/1999 |

* cited by examiner

Primary Examiner—Jill L. Heitbrink
(74) Attorney, Agent, or Firm—Birch, Stewart, Kolasch & Birch, LLP

(57) ABSTRACT

In an injection mold comprising a cavity and a gate for feeding a molding material into the cavity, the molding material fed from the gate into the cavity is divided into two streams that flow through the cavity and then meet at a confluent point so that the molding material portions are joined together along a joint plane. Two air vent gates are spaced apart from the confluent point so as to provide a larger area of the joint plane. Articles having a good outer appearance and improved strength at the material joint can be consistently manufactured to a high precision.

8 Claims, 8 Drawing Sheets

INJECTION MOLD AND METHOD FOR MANUFACTURING INJECTION MOLDED ARTICLES

This nonprovisional application claims priority under 35 U.S.C. § 119(a) on Patent Application No. 2001-353046 filed in Japan on Nov. 9, 2001, which is herein incorporated by reference.

This invention relates to an injection mold suited for injection molding liquid rubber compositions into ring-shaped articles such as O rings and square rings, and a method for manufacturing injection molded articles using the mold.

BACKGROUND OF THE INVENTION

Injection molding is suited to mass-scale production and advantageous for reducing the molding cycle and automatic operation. Molds for use in injection molding of, for example, ring-shaped articles such as rings and frames are generally configured such that a material enters a cavity (defining the article shape) from one gate and is divided into two streams which flow through the cavity and meet again at the position spaced remotest from the gate (where the material reaches latest).

The molds for injection molding have the problem that since their structures are often complex and a material flows in one direction, weld marks are frequently formed at the position where the material reaches latest. In the injection molding of seal members, typically O rings, from rubber material, precise molding is necessary to enhance gas-tightness. It is often required to minimize weld marks. Any strength lowering at weld marks is not permissible.

To improve the strength at the material flow joint and outer appearance of molded articles, the material flow joint, that is, the ultimate site where the material introduced from the gate flows and reaches (i.e., the material reaches latest) is often provided with an air vent for purging the air from the cavity (defining the article shape).

Usually one or more air vents are provided on the cavity surface at the material flow joint. Typically two or more air vents are provided when the material to be molded will undergo a prominent strength lowering at the material flow joint or in the application where any strength lowering at the material flow joint is not permissible.

The air vents are often provided not only for the purpose of purging the air at the material flow joint, but also for the purpose of allowing the partially cured portion of the injected material at its leading end to be discharged out of the cavity (defining the article shape). In the molding of seal members as described above, it is a common practice to purge through the air vents not only the air, but also the leading portion of the injected material.

Particularly in the event where high precision articles such as O rings for use in aircraft are molded, two air vents are provided on the inside and outside of the cavity at the material flow joint where the material injected into the mold reaches latest so that the air at the material flow joint is purged together with the partially cured portion of the injected material at its leading end. The provision of two air vents ensures to make the quality of molded articles consistent.

Meanwhile, fluororubber is an elastomer having excellent heat resistance, chemical resistance and mechanical strength. Seal members, typically O rings, made of fluororubber are industrially employed in a wide variety of applications including automotive and machinery industries. However, the fluororubber, when injection molded in a mold with a conventional air vent structure, tends to incur a strength lowering at the material flow joint and becomes insufficiently consistent in quality, although high reliability is necessary. For this reason, the manufacture of O rings from fluororubber is often carried out by compression molding rather than injection molding. Undesirably, the compression molding method is incompliant with mass-scale production and low efficient.

Liquid fluororubber compositions as typified by SIFEL produced by Shin-Etsu Chemical Co., Ltd. are expected to find use in O rings. However, they are difficult to produce articles in a consistent manner partly because they are difficult to mold by compression molding, and partly because an optimum mold structure has not been established for the liquid injection molding system (LIMS).

SUMMARY OF THE INVENTION

An object of the invention is to provide an injection mold which enables to mold an article having a good outer appearance and improved strength at the material flow joint; and a method for manufacturing molded articles using the mold.

According to the invention, there is provided an injection mold comprising a cavity, an inlet gate for feeding a molding material into the cavity therethrough, and at least two air vent gates in fluid communication with the cavity, wherein the molding material fed from the inlet gate into the cavity is divided into at least two streams that flow through the cavity and then meet at a confluent point so that the molding material portions are joined together along a joint plane. The air vent gates are spaced apart from the confluent point such that the area of the joint plane may become larger than the area of the joint plane given by the molding material portions when the air vent gates are disposed at the confluent point.

The mold is advantageously used in injection molding ring-shaped articles such as O rings and square rings. In one preferred embodiment, the cavity is of a ring shape having an outside and an inside in a plan view, and the air vent gates are disposed on the outside and inside and in proximity to the position located 180° remote from the inlet gate, with one air vent gate being shifted right from the 180° remote position and the other air vent gate being shifted left from the 180° remote position. Also preferably, the outside and inside air vent gates have purged molding material-receiving spaces in a volume ratio from 1:0.1 to 1:10.

The invention also provides a method for manufacturing an injection molded article using the injection mold, the method comprising the step of injecting a molding material into the cavity. The molding material used herein is typically a liquid rubber composition and especially, a liquid fluororubber composition primarily comprising a base polymer having perfluoropolyether backbone.

Specifically, in an injection mold having an article shape-defining cavity which entails a material flow joint and requires at least two air vent gates, the air vent gates are located at asymmetric positions with respect to the material flow joint plane, as embodied by the invention. Then the area of the material flow joint plane in the article molded using this mold is increased, whereby the material flow joint plane in the molded article is stabilized in strength and outer appearance. This is based on the belief that increasing the area of the joint plane by modifying the material streams to the joint plane is effective for stabilizing the joint of the material streams. Favorable results are obtained when a mold is designed based on this concept.

DESCRIPTION OF THE PREFERRED EMBODIMENTS

In the injection mold of the invention, the molding material fed from an inlet gate into a cavity is divided into at least two streams that flow through the cavity and then meet at a confluent point so that the molding material portions are joined together along a joint plane. At least two air vent gates in fluid communication with the cavity are spaced apart from the confluent point such that the area of the joint plane may become larger than the area of the joint plane given by the molding material portions when the air vent gates are disposed at the confluent point.

Figure 1:
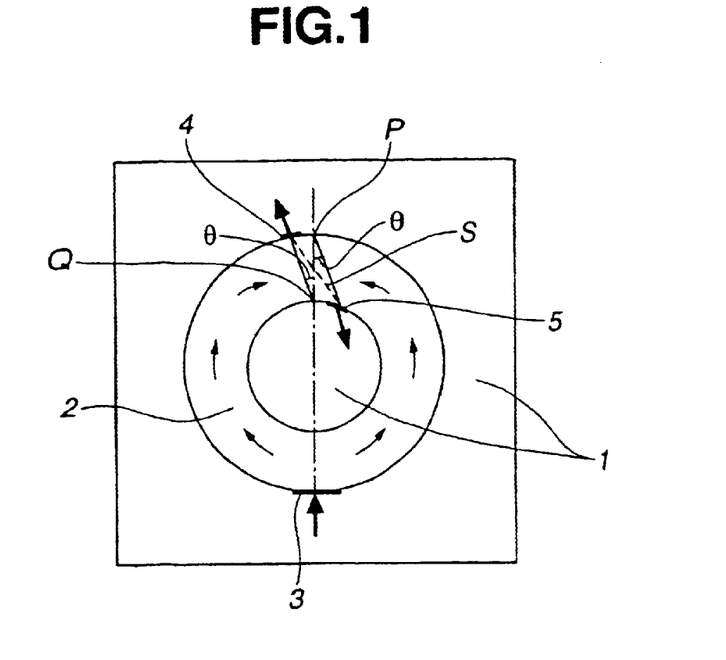
FIG. 1 schematically illustrates one exemplary air vent structure according to the invention.

Referring to FIG. 1, an injection mold as embodied by the invention is illustrated in a plan view. The mold is used in producing annular or ring-shaped articles. A mold body 1 is formed with a cavity 2 defining an annular ring shape. The cavity 2 has an outside and an inside as viewed in the plan view. At one end (the lower end in the illustrated embodiment) of the outside of the cavity 2, the mold is provided with an inlet gate 3 for feeding and injecting a molding material into the cavity 2. The molding material fed from the inlet gate 3 is divided into two streams which flow clockwise and counter-clockwise, as viewed in the figure, and then meet at an outside position P and an inside position Q on the cavity wall which are located 180° remote from the center of the inlet gate 3, that is, diametrically opposed positions. The mold is further provided with an outside air vent gate 4 and an inside air vent gate 5. These air vent gates 4 and 5 are located in proximity to the positions P and Q located 180° remote from the inlet gate 3, with the outside air vent gate 4 being shifted left from the 180° remote position and the inside air vent gate 5 being shifted right from the 180° remote position. The molding material flows through the cavity 2 in two clockwise and counter-clockwise streams to displace or purge the air in the cavity 2 from the air vent gates 4 and 5. The two streams meet at a confluent plane while the leading portions of the molding material streams are being discharged or purged from the air vent gates 4 and 5. The confluent or joint plane S between the molding material streams is in agreement with a line or plane connecting the outside and inside air vent gates 4 and 5. The joint plane S between the molding material streams has a larger area so that a higher strength is established thereat.

Figure 2:
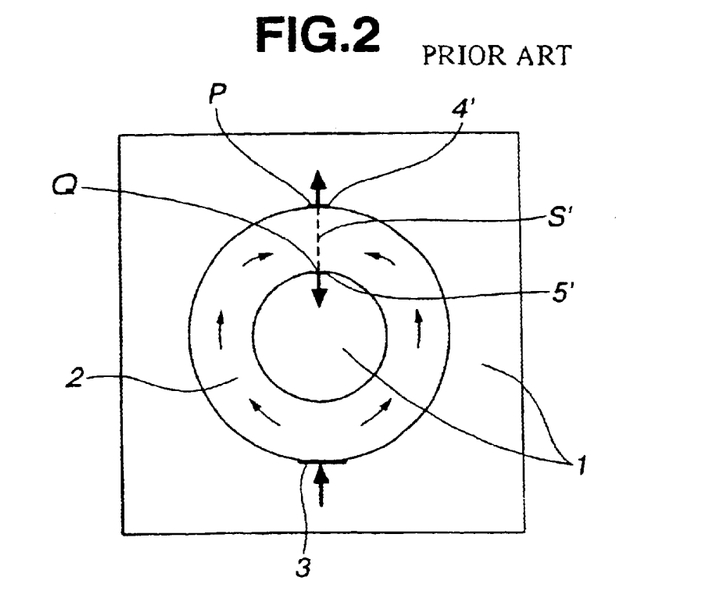
FIG. 2 schematically illustrates a prior art air vent structure.

The salient feature of the invention is better understood from a comparison with a prior art injection mold as shown in FIG. 2. In the prior art injection mold, outside and inside air vent gates 4' and 5' are located at the positions P and Q located 180° remote from the center of the molding material inlet gate 3. Then the confluent or joint plane S' between molding material streams is in agreement with a line or plane connecting the 180° remote positions P and Q, that is, diametrical plane. Note that the joint plane S' is sometimes referred to as "normal joint plane." The joint plane S' has a minimum area S'. There is a propensity that the molding material streams meet and joint at the confluent or joint plane S' before the leading portions of the molding material streams are discharged or purged from the air vent gates 4' and 5'. Then a lower strength is established at the joint between molding material streams. In contrast, the joint plane S defined between molding material streams in the mold of FIG. 1 is inclined with respect to the diametrical plane and thus has a larger area. Additionally, the location of the air vent gates 4 and 5 upstream of the 180° remote positions P and Q with respect to the respective streams ensures that the leading portions of the molding material streams are discharged or purged from the air vent gates 4 and 5. Then a better adherence and a higher strength is established at the molding material joint.

The location of air vent gates according to the invention is not limited to particular positions insofar as at least two air vent gates are located at such positions as to provide a joint plane of a greater area between molding material streams. In one embodiment of forming an O ring, two air vent gates are preferably located at two outside and inside positions which are spaced apart from the normal joint plane in opposite directions as shown in FIG. 1 (i.e., positions falling outside the joint plane which is symmetrical with respect to the center of the joint plane). In a preferred embodiment, the outside air vent gate 4 is located at such a position that the angle θ included between a line connecting the gate center to the inside 180° remote position Q and the diametrical line connecting the outside and inside 180° remote positions P and Q is from more than 0° to 45°, especially from 2° to 30°. Also preferably, the inside air vent gate 5 is located at such a position that the angle θ included between a line connecting the gate center to the outside 180° remote position P and the diametrical line connecting the outside and inside 180° remote positions P and Q is from more than 0° to 45°, especially from 2° to 30°. The dimensions (width, length and depth) of the air vent gates vary with a particular type of molding material and may be selected as appropriate for the particular molding material used.

Although satisfactory effects are achieved with the mold structure having air vent gates at the non-diametrical positions as described above, better effects are achieved when an air vent associated with each gate is divided into at least two spaces, a space for receiving the purged material and a space for receiving air. The purged material-receiving space is a region that is disposed contiguous to the air vent gate, and the air-receiving space is a region that is disposed remote from the air vent gate, but contiguous to the purged material-receiving space.

The reason why the air vent is divided into at least two spaces is that the division of the air vent into a purged material-receiving space and an air-receiving space prevents the air vent from being clogged. This avoids an accidental situation that one air vent is clogged and the molding material is purged into the remaining air vents.

Figure 3:
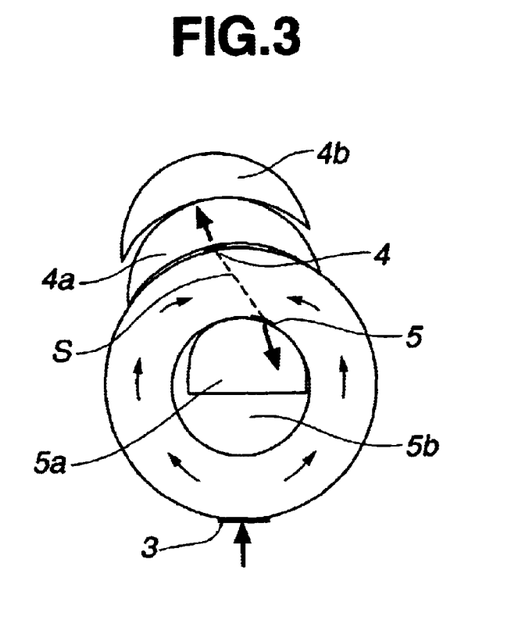
FIG. 3 schematically illustrates one exemplary air vent structure in which the air vent is divided into a purged material-receiving space and an air-receiving space.
Figure 4:
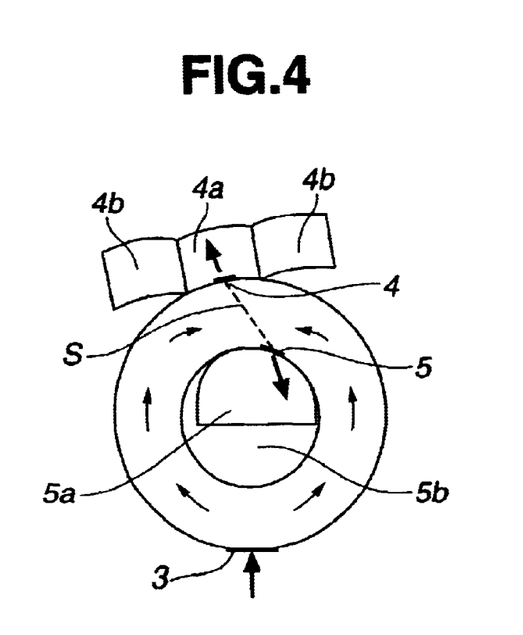
FIG. 4 schematically illustrates another exemplary air vent structure in which the air vent is divided into a purged material-receiving space and an air-receiving space.

Referring to FIGS. 3 and 4, there are schematically illustrated exemplary structures in which each air vent is divided into a purged material-receiving space and an air-receiving space. As shown in FIGS. 3 and 4, each air vent is divided into a purged material-receiving space 4a, 5a and an air-receiving space 4b, 5b in accordance with the purged amount of molding material, which ensures that the purged amounts of molding material in at least two purged material-receiving spaces are equalized, and that the air is completely displaced from the cavity (defining the article shape). This protects molded articles from weld marks and defects by incidental entrapment of air.

Preferably two or more purged material-receiving spaces disposed on the outside and inside and any additional positions of the cavity have close volume fractions. In the embodiment illustrated in FIGS. 3 and 4 wherein two air vents are disposed on the outside and inside of the cavity, ideally the purged material-receiving spaces are designed in a volume ratio of 1:1. Since a certain mold structure makes it difficult to design the spaces to equality, it is recommended that the two purged material-receiving spaces 4a and 5a on the outside and inside be designed in a volume ratio of from 1:0.1 to 1:10, and especially from 1:0.2 to 1:5. If the volume ratio is far outside the range of 1:0.1–10, the resulting situation is approximate to the situation where one air vent is filled and clogged with the purged material, and the desired effect resulting from two or more air vents is not substantially expectable. The preferred embodiment of the invention, in which the purged amounts of molding material in the purged material-receiving spaces disposed at two or more positions, typically the outside and inside are kept in good balance, is effective for stabilizing the flow of the molding material throughout the cavity.

Additionally, the purged material-receiving space 4a, 5a and the air-receiving space 4b, 5b are preferably set in a volume ratio of from 1:0.1 to 1:10, and especially from 1:0.2 to 1:5. This setting is effective for further stabilizing the material joint plane in the molded article.

The division of the air vent into a purged material-receiving space and an air-receiving space is possible insofar as they can be given approximately the same depth and width as in the air vent gate.

The injection mold of the invention is typically subjected to surface treatment for improving abrasion resistance, preventing corrosion and improving mold release properties or for any other purpose. The surface treatment may be any ordinary mold surface treatment as typified by nickel plating or chromium plating although surface treatment with diamond-like carbon (DLC) or tri-iron tetroxide is preferred.

DLC is prepared by decomposing hydrocarbon gases with an arc discharge plasma in high vacuum, electrically accelerating ions and excited molecules in the plasma, and causing them to impinge with sufficient energy, thereby forming a film of DLC. The film has a dense amorphous structure and a very smooth surface free of grain boundaries, and exhibits excellent properties including a low friction coefficient, abrasion resistance and mold release.

Although surface treatment with tri-iron tetroxide is generally employed on aluminum die-casting molds, this treatment is also applicable to the inventive mold because of its mold release effects to liquid fluororubber and analogues.

The surface treatment with DLC or tri-iron tetroxide achieves a significant improvement in mold release properties, with the following advantages. (1) The defects introduced in molded articles by cutting upon removal thereof from the mold are minimized. (2) The removal of molded articles from the mold is significantly facilitated, and the molding cycle can be reduced. (3) Molded articles can be removed without a need for parting agents, preventing the mold from being contaminated with parting agents and eliminating a need for mold cleaning.

The shape of articles which can be molded using the inventive mold is not critical insofar as the article shape includes a material joint plane. Better results are obtained with ring-like shapes such as O rings and square rings and frame-like shapes. The invention is most effective for ring-shaped molded articles. With respect to O rings which are typical examples of ring-shaped articles, even high-precision seal members for use in aircraft can be produced at a high reliability level. While aircraft O rings are often produced to the specification setting forth a flash thickness of not greater than 0.13 mm, the inventive mold is best suited for such precision molding.

The material which can be molded using the inventive mold is selected from, for example, thermoplastic resins, thermosetting resins, rubber materials of the millable type, and rubber materials of the liquid type. Especially useful materials are rubber materials of the liquid type such as liquid silicone rubber compositions and liquid fluororubber compositions, with the liquid fluororubber compositions being most useful.

Typical of the liquid fluororubber compositions are those based on a base polymer having a perfluoropolyether backbone, such as SIFEL produced by Shin-Etsu Chemical Co., Ltd. These are often used in the manufacture of O rings for aircraft requiring high precision and high reliability.

The method of manufacturing molded articles using the inventive mold can be carried out according to conventional processes. When liquid rubber compositions are molded, for example, an appropriate injection rate is 0.01 to 1,000 cc/sec. An injection rate below the range may lead to a substantial loss of production efficiency whereas a rate above the range may cause air to be entrapped in the molded articles and scorching. A more appropriate injection rate is 0.1 to 500 cc/sec.

The molding temperature is in the range of 80 to 200° C., at which the molding material is held for a time for crosslinking, typically 1 to 600 seconds. A lower molding temperature may require a longer crosslinking time, leading to a loss of production efficiency. A higher molding temperature may cause crosslinking to proceed while the material flows through the cavity, so that the material loses flow, with a failure of molding. Most preferably, the molding temperature is set in the range of 100 to 180° C.

There has been described a mold structure in which air vent gates are spaced apart from the diametrical plane and which ensures consistent manufacture of high precision molded articles. The molded articles thus obtained have a satisfactory outer appearance and an increased strength at the material joint.

EXAMPLE

Examples of the invention are given below by way of illustration and not by way of limitation.

The molding machine, mold and material used in Examples and Comparative Examples are described below.
Molding Machine 7-ton LIMS molding machine (trade name HM-7, LIMS specification, Nissei Resin Co., Ltd.)

10-ton LIMS molding machine (trade name NS-10, LIMS specification, Nissei Resin Co., Ltd.)

Mold

All molds made by PRC Co. whose product shape and dimensions, air vent shape and dimensions are shown in Table 1 and FIGS. 5 to 12.

Material

SIFEL 4750 (trade name of liquid fluororubber composition by Shin-Etsu Chemical Co., Ltd.)

SIFEL 3701 (trade name of liquid fluororubber composition by Shin-Etsu Chemical Co., Ltd.)

KE 1990-60 (trade name of liquid silicone rubber composition by Shin-Etsu Chemical Co., Ltd.)

TABLE 1

Figure 5:
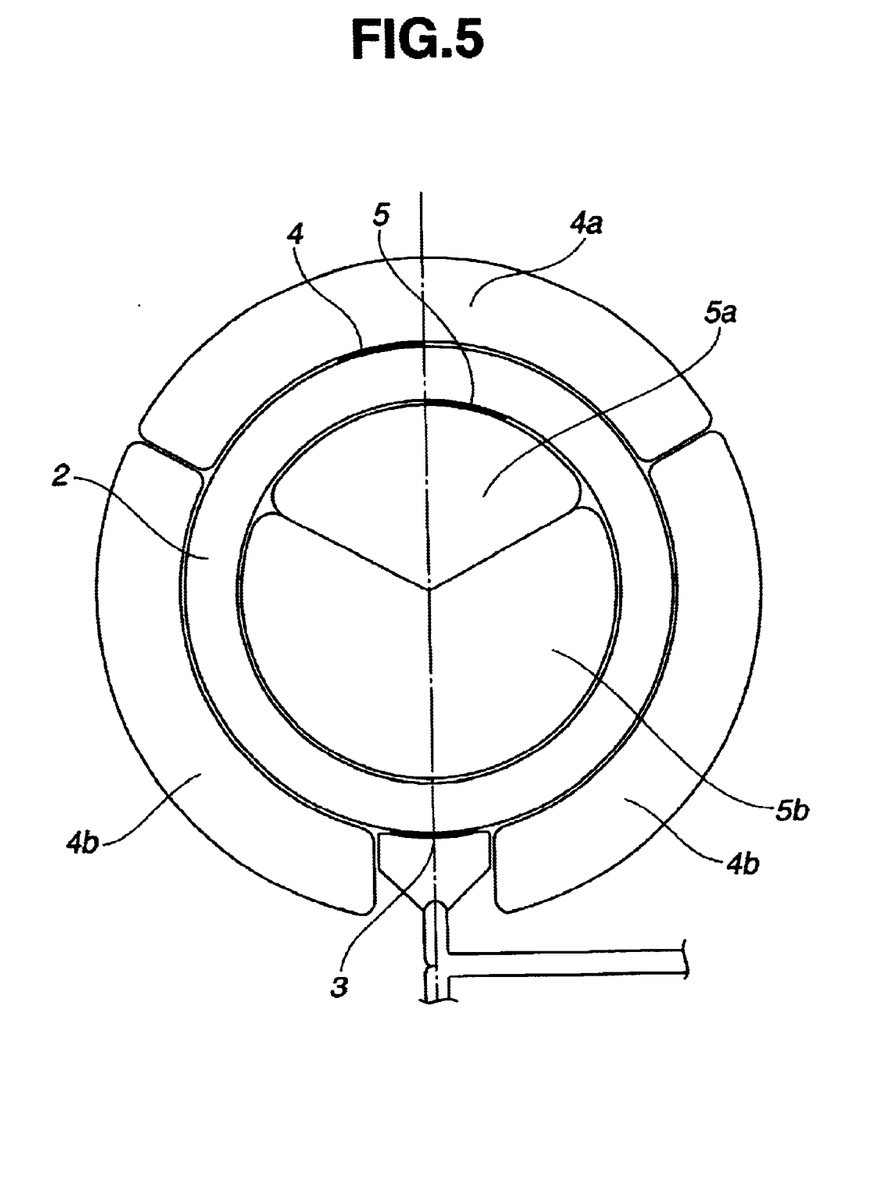
FIG. 5 schematically illustrates an air vent structure in an injection mold used in Examples 1 and 5.
Figure 6:
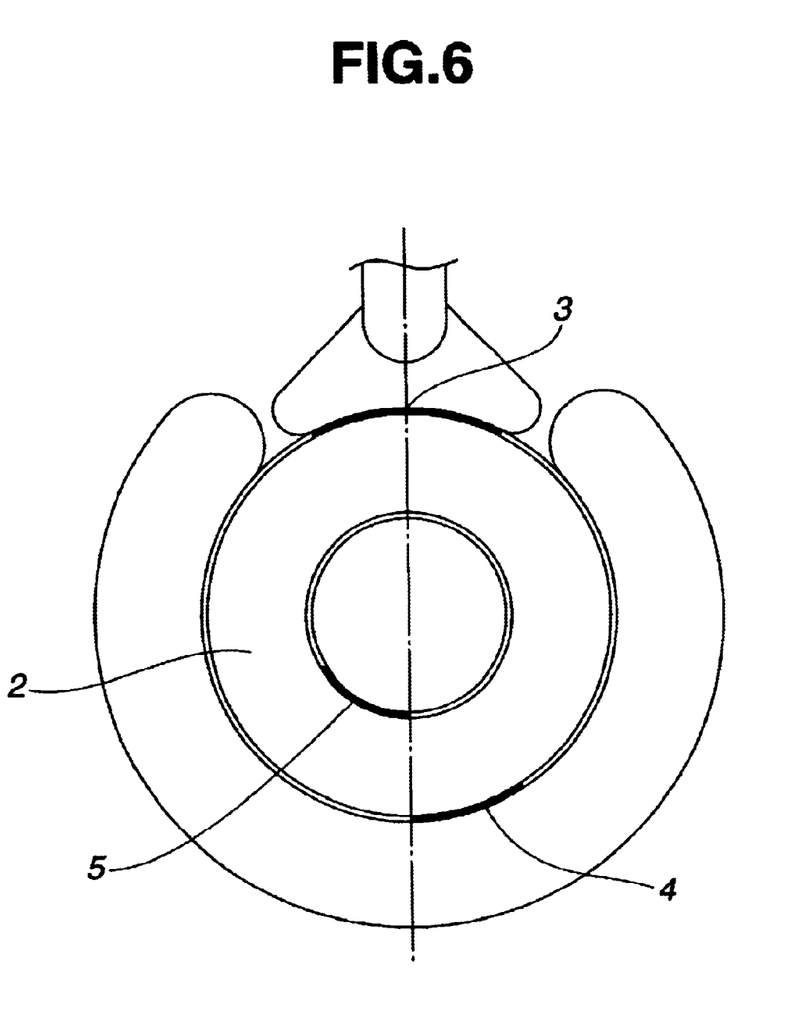
FIG. 6 schematically illustrates an air vent structure in an injection mold used in Examples 2 and 6.
Figure 7:
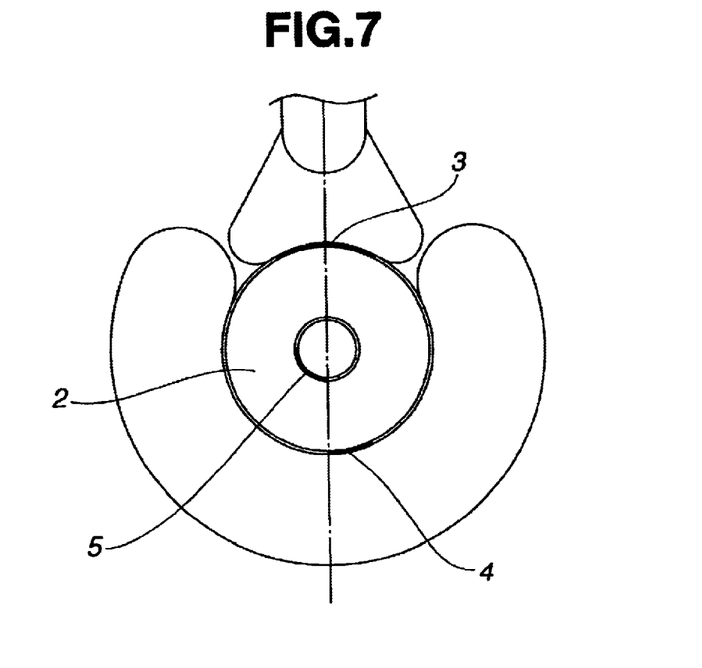
FIG. 7 schematically illustrates an air vent structure in an injection mold used in Examples 3 and 7.
Figure 8:
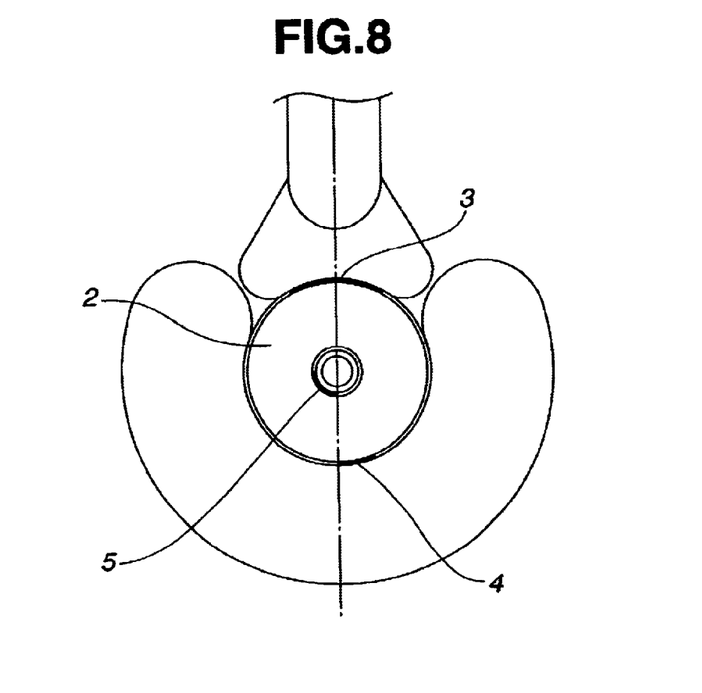
FIG. 8 schematically illustrates an air vent structure in an injection mold used in Example 4.
Figure 9:
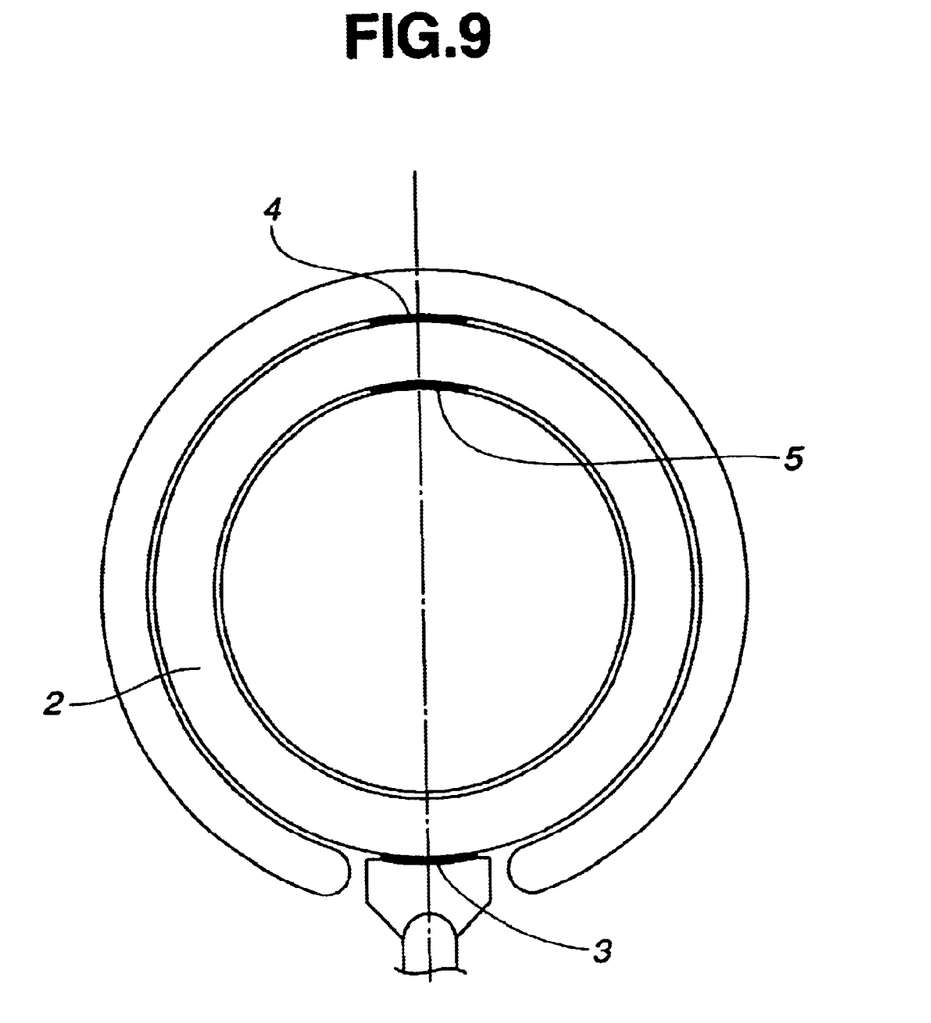
FIG. 9 schematically illustrates an air vent structure in an injection mold used in Comparative Examples 1 and 5.
Figure 10:
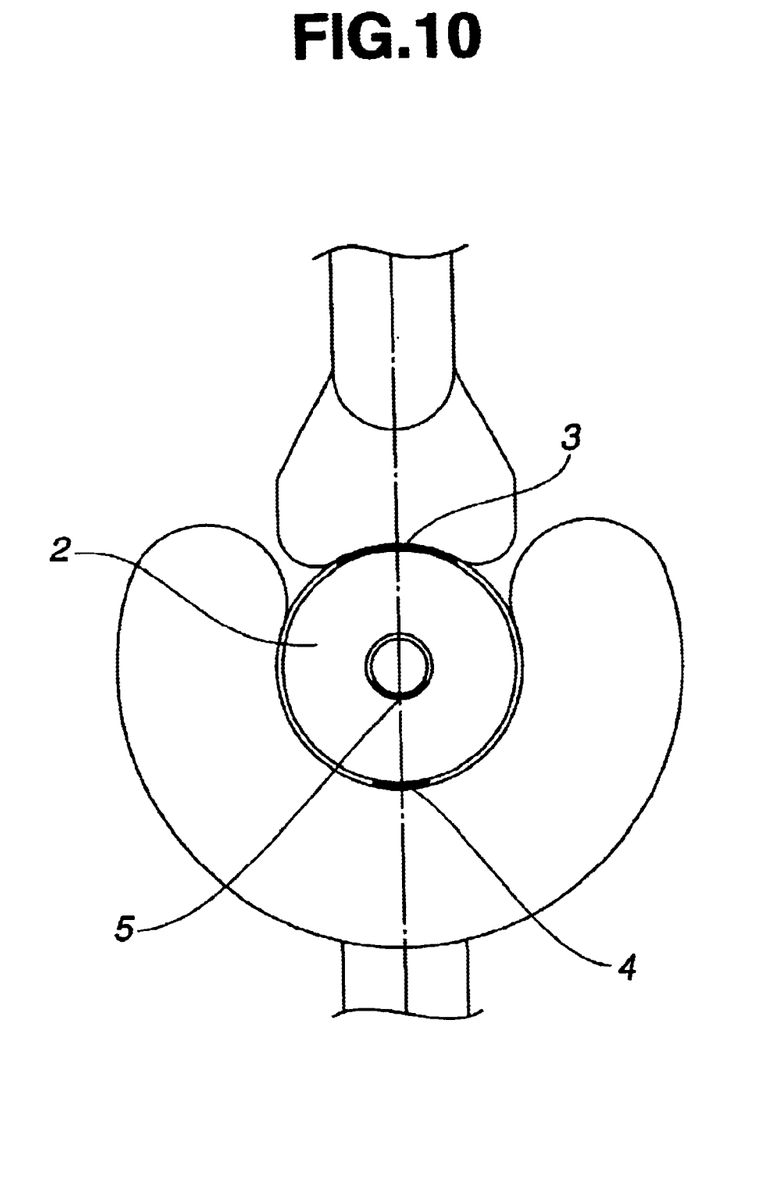
FIG. 10 schematically illustrates an air vent structure in an injection mold used in Comparative Examples 2 and 6.
Figure 11:
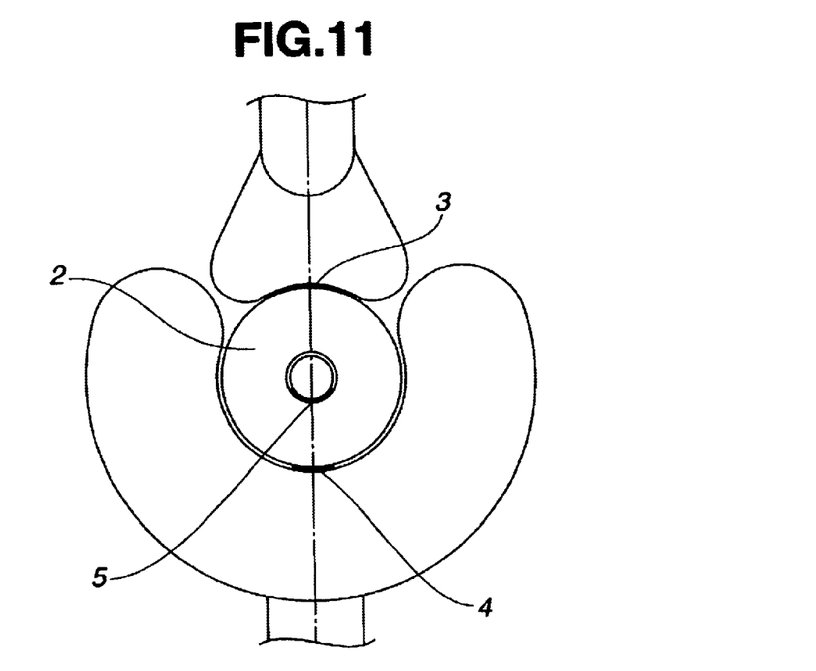
FIG. 11 schematically illustrates an air vent structure in an injection mold used in Comparative Examples 3 and 7.
Figure 12:
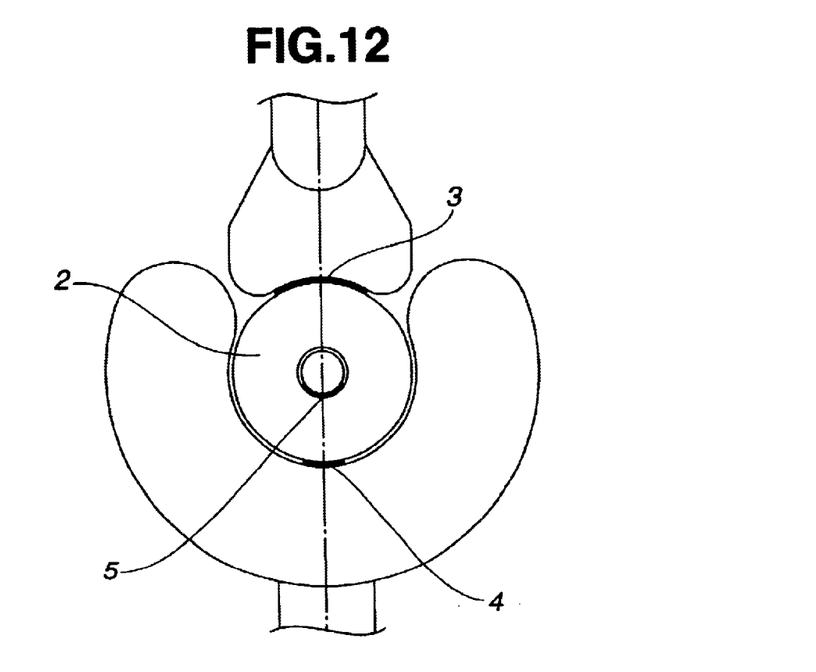
FIG. 12 schematically illustrates an air vent structure in an injection mold used in Comparative Example 4.

| Mold No. | O ring shape | | Air vent | | | Cavity |
|---|---|---|---|---|---|---|
| | Inner dia-meter (mm) | Thick-ness (mm) | Gate position | Gate size (mm) | Divi-sion | number in a mold | Figure |
| 1 | 24.99 | 3.53 | inventive | 6.0 | yes* | 4 | FIG. 5 |
| 2 | 13.94 | 2.62 | inventive | 2.0 | no | 4 | FIG. 6 |
| 3 | 3.68 | 1.78 | inventive | 0.85 | no | 1 | FIG. 7 |
| 4 | 0.74 | 1.78 | inventive | 0.6 | no | 1 | FIG. 8 |
| 5 | 24.99 | 3.53 | conventional | 6.0 | no | 4 | FIG. 9 |
| 6 | 13.94 | 2.62 | conventional | 2.0 | no | 4 | FIG. 10 |
| 7 | 3.68 | 1.78 | conventional | 0.85 | no | 1 | FIG. 11 |
| 8 | 0.74 | 1.78 | conventional | 0.6 | no | 1 | FIG. 12 |

*The air vent is divided into a purged material-receiving space and an air-receiving space in a volume ratio of about 1:2.

The materials were injected into the injection molds shown in Table 1 and FIGS. 5 to 12 under optimum conditions shown in Tables 2 to 6, producing O rings. The rings were post cured at 200° C. for 4 hours for stabilizing the physical properties thereof.

In terms of strength, elongation and outer appearance, these O rings were examined for comparison. It is noted that the O rings molded using the molds (mold Nos. 3, 4, 7 and 8) shown in FIGS. 7, 8, 11 and 12 were difficult to measure strength on account of small size, and so, only the elongation was measured using a taper gage and the outer appearance observed. The reported measurement is a median among the measurements of five randomly selected O ring samples.

Examples 1–4 & Comparative Examples 1–4

O rings of various shapes were manufactured using SIFEL 4750 as the molding material and the molds and conditions shown in Tables 2 and 3. They were examined for strength, elongation and outer appearance by visual observation. The results are also shown in Tables 2 and 3.

TABLE 2

| Material, molding conditions, evaluation | Example 1 | Example 2 | Example 3 | Example 4 |
|---|---|---|---|---|
| Material | SIFEL 4750 | SIFEL 4750 | SIFEL 4750 | SIFEL 4750 |
| Mold No. | 1 | 2 | 3 | 4 |
| Molding machine | 10 ton | 7 ton | 7 ton | 7 ton |
| Molding temp. (° C.) | 120 | 120 | 120 | 120 |
| Injection time (sec) | 30 | 30 | 20 | 20 |
| O ring strength (MPa) | 5.2 | 5.5 | — | — |
| O ring elongation (%) | 100 | 90 | 110 | 120 |
| Visual appearance | Good | Good | Good | Good |

TABLE 3

| Material, molding conditions, evaluation | Comparative Example 1 | Comparative Example 2 | Comparative Example 3 | Comparative Example 4 |
|---|---|---|---|---|
| Material | SIFEL 4750 | SIFEL 4750 | SIFEL 4750 | SIFEL 4750 |
| Mold No. | 5 | 6 | 7 | 8 |
| Molding machine | 10 ton | 7 ton | 7 ton | 7 ton |
| Molding temp. (° C.) | 120 | 120 | 120 | 120 |
| Injection time (sec) | 30 | 30 | 20 | 20 |
| O ring strength (MPa) | 3.2 | 3.4 | — | — |
| O ring elongation (%) | 50 | 60 | 70 | 50 |
| Visual appearance | Weld marks | Weld marks | Good | Good |

The O rings produced in Examples 1 and 2 using the mold having the air vent structure according to the invention showed a satisfactory outer appearance whereas the O rings of the same shape produced in Comparative Examples 1 and 2 using the mold having a conventional air vent structure showed an apparently deficient outer appearance. The strength and elongation measurements of the O rings of Comparative Examples 1 and 2 were lower than in Examples 1 and 2. An observation of O ring samples that broke during the strength measurement revealed that all the O ring samples of Comparative Examples 1 and 2 broke at the material joint whereas the O ring samples of Examples 1 and 2 broke at positions other than the material joint.

The O rings of Comparative Examples 3 and 4 have no deficiency in outer appearance probably due to their small size, but their elongation is apparently lower than that of the O rings of the same shape produced in Examples 3 and 4 using the mold having the air vent structure according to the invention.

Examples 5–7 & Comparative Examples 5–7

O rings of various shapes were manufactured using SIFEL 3701 as the molding material and the molds and conditions shown in Tables 4 and 5. They were examined as in Examples 1–4. The results are also shown in Tables 4 and 5.

TABLE 4

| Material, molding conditions, evaluation | Example 5 | Example 6 | Example 7 |
|---|---|---|---|
| Material | SIFEL 3701 | SIFEL 3701 | SIFEL 3701 |
| Mold No. | 1 | 2 | 3 |
| Molding machine | 10 ton | 7 ton | 7 ton |
| Molding temp. (° C.) | 130 | 130 | 130 |
| Injection time (sec) | 10 | 5 | 5 |
| O ring strength (MPa) | 6.1 | 6.5 | — |
| O ring elongation (%) | 150 | 190 | 170 |
| Visual appearance | Good | Good | Good |

TABLE 5

| Material, molding conditions, evaluation | Comparative Example 5 | Comparative Example 6 | Comparative Example 7 |
|---|---|---|---|
| Material | SIFEL 3701 | SIFEL 3701 | SIFEL 3701 |
| Mold No. | 5 | 6 | 7 |

TABLE 5-continued

| Material, molding conditions, evaluation | Comparative Example 5 | Comparative Example 6 | Comparative Example 7 |
|---|---|---|---|
| Molding machine | 10 ton | 7 ton | 7 ton |
| Molding temp. (° C.) | 130 | 130 | 130 |
| Injection time (sec) | 10 | 5 | 5 |
| O ring strength (MPa) | 5.2 | 5.5 | — |
| O ring elongation (%) | 130 | 130 | 150 |
| Visual appearance | Weld marks | Good | Good |

Even when a different material was used, approximately the same results as in Examples 1–4 and Comparative Examples 1–4 were obtained.

The only difference was found with the O ring of Comparative Example 6 using mold No. 6. Weld marks developed in the O ring of Comparative Example 2 whereas no weld marks developed in the O ring of Comparative Example 6. However, the strength is inferior to that of the O ring of the same shape produced in Example 6 using the mold having the air vent structure according to the invention.

Examples 8–9 & Comparative Examples 8–9

O rings of various shapes were manufactured using the liquid silicone rubber composition KE 1900-60 as the molding material and the molds and conditions shown in Table 6. They were examined as in Examples 1–4. The results are also shown in Table 6.

TABLE 6

| Material, molding conditions, evaluation | Example 8 | Example 9 | Comparative Example 8 | Comparative Example 9 |
|---|---|---|---|---|
| Material | KE 1990-60 | KE 1990-60 | KE 1990-60 | KE 1990-60 |
| Mold No. | 1 | 2 | 5 | 6 |
| Molding machine | 10 ton | 7 ton | 10 ton | 7 ton |
| Molding temp. (° C.) | 140 | 140 | 140 | 140 |
| Injection time (sec) | 10 | 5 | 10 | 5 |
| O ring strength (MPa) | 6.5 | 6.8 | 5.1 | 4.9 |
| O ring elongation (%) | 210 | 220 | 170 | 180 |
| Visual appearance | Good | Good | Good | Good |

As compared with the liquid fluororubber compositions, the liquid silicone rubber composition developed few weld marks. With respect to strength and elongation, however, a definite difference was found between Examples and Comparative Examples.

Japanese Patent Application No. 2001-353046 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. An injection mold comprising a cavity, an inlet gate for feeding a molding material into the cavity therethrough, and at least two air vent gates in fluid communication with the cavity wherein the molding material fed from the inlet gate into the cavity is divided into at least two streams that flow through the cavity and then meet at a confluent point so that the molding material portions are joined together along a joint plane, and the joint plane connecting the air vent gates are spaced apart from the confluent point such that the area of the joint plane may become larger than the area of the joint plane given by the molding material portions when the air vent gates are disposed at the confluent point.

2. The injection mold of claim 1 wherein the cavity is of a ring shape having an outside and an inside in a plan view, and the air vent gates are disposed on the outside and inside and in proximity to the position located 180° remote from the inlet gate, with one air vent gate being shifted right from the 180° remote position and the other air vent gate being shifted left from the 180° remote position.

3. The injection mold of claim 2 wherein the outside and inside air vents have purged molding material-receiving spaces in a volume ratio from 1:0.1 to 1:10.

4. The injection mold of claim 2 which is used in molding of a ring-shaped article.

5. A method for manufacturing an injection molded article in the injection mold of claim 1, the method comprising the step of injecting a molding material into the cavity.

6. The method of claim 5 wherein the molding material is a liquid rubber composition.

7. The method of claim 6 wherein the liquid rubber composition is a liquid fluororubber composition primarily comprising a base polymer having perfluoropolyether backbone.

8. The method of claim 5 wherein the molded article is an O ring or square ring.

* * * * *